United States Patent
Cox

(10) Patent No.: US 9,751,621 B2
(45) Date of Patent: Sep. 5, 2017

(54) STEERING CONTROL IN AN AIRCRAFT EQUIPPED WITH A WHEEL DRIVE SYSTEM

(71) Applicant: Isaiah W. Cox, London (GB)

(72) Inventor: Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 317 days.

(21) Appl. No.: 14/341,742

(22) Filed: Jul. 25, 2014

(65) Prior Publication Data

US 2015/0129713 A1    May 14, 2015

(51) Int. Cl.
*B64C 25/40*    (2006.01)
*B64C 25/50*    (2006.01)

(52) U.S. Cl.
CPC ............ *B64C 25/405* (2013.01); *B64C 25/50* (2013.01); *Y02T 50/823* (2013.01)

(58) Field of Classification Search
USPC .................................... 244/50, 103 R, 100 R
See application file for complete search history.

(56) References Cited

U.S. PATENT DOCUMENTS

| | | | |
|---|---|---|---|
| 3,807,664 A | 4/1974 | Kelly, Jr. et al. | |
| 6,671,588 B2 * | 12/2003 | Otake | B64C 25/48 244/175 |
| 7,445,178 B2 * | 11/2008 | McCoskey | B64F 1/32 244/100 R |
| 7,469,858 B2 | 12/2008 | Edelson | |
| 7,891,609 B2 | 2/2011 | Cox | |
| 7,975,960 B2 | 7/2011 | Cox | |
| 8,109,463 B2 | 2/2012 | Cox | |
| 8,517,303 B2 * | 8/2013 | Dilmaghani | B64C 25/405 244/100 R |
| 8,620,493 B2 * | 12/2013 | Hughes | G05D 1/0083 244/76 R |
| 8,714,481 B2 | 5/2014 | Sweet et al. | |
| 9,074,891 B2 * | 7/2015 | Nutaro | G01C 21/00 |
| 9,193,449 B2 * | 11/2015 | Cox | B64C 25/405 |
| 9,280,155 B2 * | 3/2016 | Cox | G05D 1/0083 |
| 9,417,629 B2 * | 8/2016 | Nutaro | G05D 1/0011 |
| 2007/0282491 A1 * | 12/2007 | Cox | B64C 25/40 701/3 |
| 2008/0147252 A1 * | 6/2008 | Bayer | B64C 25/50 701/3 |
| 2008/0203217 A1 * | 8/2008 | Frank | B64F 1/22 244/50 |

(Continued)

FOREIGN PATENT DOCUMENTS

GB    2457144 A    8/2009

*Primary Examiner* — Christopher P Ellis

(57) ABSTRACT

Control of aircraft steering during ground travel is provided in an aircraft equipped with an engines-off wheel drive system controllable to move the aircraft autonomously on the ground without reliance on the aircraft's main engines or external tow vehicles. The wheel drive system is designed to interact with the aircraft's nose wheel hydraulic steering system to augment or replace the hydraulic steering system with the operation of the wheel drive system at taxi speeds, particularly at very low taxi speeds and even when the aircraft is stopped, to steer the aircraft as it maneuvers through turns during ground travel between landing and takeoff and at other times.

6 Claims, 2 Drawing Sheets

(56) References Cited

U.S. PATENT DOCUMENTS

| | | | | |
|---|---|---|---|---|
| 2009/0261197 | A1* | 10/2009 | Cox | B64C 25/36 244/50 |
| 2009/0294577 | A1* | 12/2009 | Roques | B64C 25/40 244/50 |
| 2013/0200209 | A1* | 8/2013 | Goldman | B64C 25/405 244/50 |
| 2014/0225421 | A1* | 8/2014 | Oswald | B64C 25/405 301/6.2 |
| 2015/0266565 | A1* | 9/2015 | Cox | B64C 25/405 244/50 |
| 2015/0329202 | A1* | 11/2015 | Cox | B64C 25/50 244/103 S |

* cited by examiner

STEERING CONTROL IN AN AIRCRAFT EQUIPPED WITH A WHEEL DRIVE SYSTEM

PRIORITY CLAIM

This application claims priority from International Patent Application No. PCT/US2013/69830, filed 13 Nov. 2013, now withdrawn, the disclosure of which is fully incorporated herein by reference.

TECHNICAL FIELD

The present invention relates generally to aircraft ground travel steering systems and specifically to a steering system for an aircraft equipped with a drive wheel system for driving an aircraft autonomously during ground travel.

BACKGROUND OF THE INVENTION

After an aircraft lands on a runway at an airport or airfield, the aircraft must travel to an arrival destination, such as a gate or other parking location. An aircraft's travel path from touchdown to the point where passengers and/or cargo can be unloaded typically requires the aircraft to change its direction of travel as it moves along the ground. Virtually all commercial sized aircraft use the nose landing gear wheels to effect changes in ground travel or taxi direction. Most aircraft have a pair of nose landing gear wheels at the forward end of the aircraft connected with a steering system that enables a pilot in the aircraft cockpit to control the movement of the nose wheels to the right or to the left as needed to move the aircraft in a required right or left direction. Typically, hydraulic power is used to turn the nose wheels in response to pilot input from rudder pedals, a tiller wheel, or both. The steering systems of different kinds of aircraft may use specific variations of these components.

Many aircraft accomplish steering by swiveling a lower portion of the shock strut of the nose landing gear wheels. A hydraulic steering unit is usually mounted on a fixed portion of the shock strut and is linked to a swiveling portion of the landing gear structure to which the nose wheel or nose wheels are attached. Typically, a hydraulic steering unit includes valves and other components that enable the steering system to act as a shimmy damper when it is not used for steering. The nose wheel steering system is linked to rudder pedals in the cockpit, which are activated to turn the aircraft in a desired direction. Activation of the rudder pedals can turn the nose wheels through only a relatively small steering angle, however. If it is necessary to turn the aircraft through a greater steering angle, differential braking is usually used. In this event, the steering unit will be disengaged so that the nose wheels swivel freely.

In a Boeing 737, a hydraulic system is used in combination with both rudder pedals and a tiller wheel to turn the nose wheels to either side over a range of from zero degrees to about 78°. An interconnect mechanism enables control of steering by both rudder pedals and a tiller wheel. The tiller wheel provides the maximum steering and direction change of the nose wheels up to about 78°, while the rudder pedals provide steering when small directional changes are required. Full deflection of the rudder pedals produces about 7° of nose wheel steering. The rudder pedals are engaged to steer the nose wheels only when the aircraft is traveling on the ground between landing and takeoff. Squat switches and the like are included on the nose landing gear to ensure that the rudder pedals are operable to steer the nose wheels only when the aircraft is on the ground and are disengaged when the aircraft is airborne.

Other aircraft steering systems, such as that employed by the Airbus 320 aircraft, use electrical controls in combination with the aircraft's rudder pedals and tiller wheel to control steering during ground travel. The position of the nose landing gear wheels is measured by a transducer, which may be a linear or rotary variable differential transducer. Information relating to nose wheel position is sent to a brake and steering control unit and is compared to tiller or rudder input to produce a nose wheel steering angle. The nose wheels can be turned up to 75° manually by the tiller wheel. A hydraulic valve in the steering hydraulic system is commanded to send more or less pressure to a hydraulic actuating cylinder to move the nose wheels as commanded. This occurs when appropriate switches are on, a towing control lever is in a normal position, and at least one engine is running when the aircraft is on the ground.

Aircraft steering systems must be deactivated when aircraft are pushed back from a departure gate or location, towed, or otherwise moved on the ground by attached tugs or tow vehicles. This requires cooperative action by both ground crew and the aircraft's cockpit crew to ensure that landing gear steering is disabled and signals from rudder pedals and other steering system components are prevented from reaching steering system controls.

As indicated above, aircraft steering systems can be electrically or mechanically controlled and typically include a hydraulic system that may be electrically actuated to control steering angle. Rudder pedal steering, by itself, may not allow the nose wheel steering needed to maneuver on all airport taxiways or within ramp areas. In some aircraft, turns of a greater steering angle than is possible with rudder pedals require the disengagement of the steering unit so that the nose wheels can swivel freely, which can be done automatically. Achieving a greater angle of turn than the 7° possible with rudder pedals could require the use of differential braking and/or thrust. The use of differential braking forces to change travel direction while an aircraft's engines are operating to move the aircraft on the ground after landing is disclosed in U.S. Pat. No. 6,671,588 to Otake et al.

Available aircraft steering systems are used on aircraft that rely on the operation of one or more of the aircraft's main engines to move the aircraft during ground travel. Moving an aircraft autonomously on the ground without reliance on the aircraft's main engines or tow vehicles has been proposed. U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external vehicles. These drive systems effectively move aircraft autonomously during ground travel between landing and takeoff and at other times. It is not suggested that these drive systems could interact with an aircraft's nose wheel steering system to provide more effective or improved nose wheel steering.

The self-contained taxi system described by Kelly et al in U.S. Pat. No. 3,807,664 includes a mechanism connected to an aircraft's main wheels that controls wheel drive speed and torque to drive aircraft wheels at taxi speed and an aircraft's electro-hydraulic steering system to control nose wheel steering during taxi. Control of aircraft movement and nose wheel steering is accomplished primarily by regulating hydraulic fluid flow, and it is not suggested how the wheel drive speed/torque mechanism described could affect nose wheel steering, at low or other travel speeds.

A need exists for a system capable of controlling nose wheel steering, especially at low speeds, in an aircraft equipped with a wheel drive system that enables the aircraft to be driven autonomously on the ground without reliance on the aircraft's main engines or external tow vehicles.

SUMMARY OF THE INVENTION

It is a primary object of the present invention, therefore, to provide a system capable of controlling nose wheel steering, especially at low speeds, in an aircraft equipped with a wheel drive system that enables the aircraft to move autonomously on the ground without reliance on the aircraft's main engines or external tow vehicles.

It is another object of the present invention to provide a steering control system in an aircraft equipped with an engines-off wheel drive system that enables the aircraft to move autonomously on the ground wherein the wheel drive system interacts with the aircraft's nose wheel hydraulic steering system to augment or replace the hydraulic steering system.

It is an additional object of the present invention to provide a steering control system in an aircraft equipped with an engines-off wheel drive system that enables the aircraft to move autonomously on the ground designed to employ differential thrust from the drive system in conjunction with or instead of the aircraft's nose wheel hydraulic steering system at wheel drive system taxi speeds.

It is a further object of the present invention to provide control of steering in an aircraft equipped with an engines-off wheel drive system for autonomous ground movement when an aircraft is moving at low speed wherein interaction between the aircraft's steering system control signals and the operation of the wheel drive system produces a required change in direction of ground travel.

In accordance with the aforesaid objects, control of aircraft steering during ground travel is provided in an aircraft equipped with a wheel drive system controllable to move the aircraft autonomously on the ground without reliance on the aircraft's main engines or external tow vehicles. The engines-off wheel drive system is designed to interact with the aircraft's nose wheel hydraulic steering system to augment or replace the hydraulic steering system with the operation of the wheel drive system at taxi speeds, particularly at very low taxi speeds and even when the aircraft is stopped, to steer the aircraft as it maneuvers on the ground between landing and takeoff and at other times.

Other objects and advantages will be apparent from the following description, claims, and drawings.

DESCRIPTION OF THE INVENTION

Figure 1:
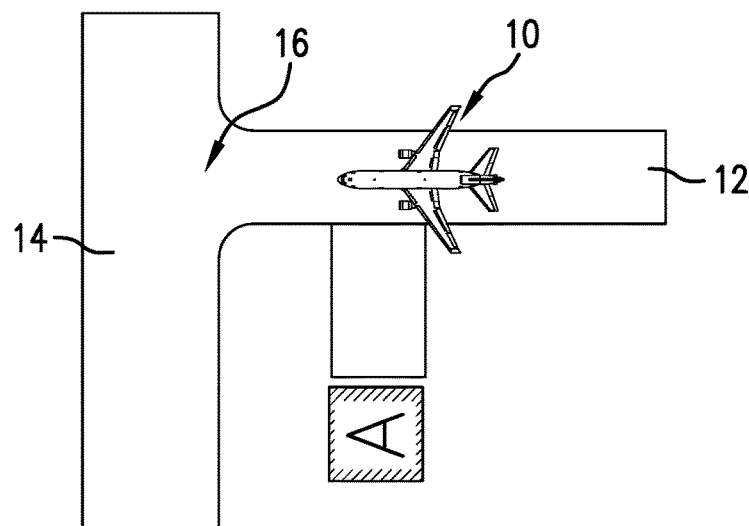
FIG. 1 shows an aircraft traveling on an airport or airfield runway along a ground travel path that will require a change in travel direction and control of nose wheel steering in accordance with the present invention.

Aircraft taxiing at airports and airfields at the present time rely on the aircraft's main engines and/or external tow vehicles to provide the motive power to move the aircraft during ground travel between landing and takeoff. Since an aircraft's route between a touch down location on a runway and an arrival location at a gate or other destination or between departure and take off is only rarely a straight path, aircraft steering systems, such as those described above, are required to enable taxiing aircraft to change travel direction. Taxiing aircraft typically reach top speeds in the range of about 28 miles per hour. Turning an aircraft's nose wheels to change the aircraft's direction of travel at this speed range is relatively easy. Turning an aircraft's nose wheels to change the aircraft's direction of travel when the aircraft is traveling at a very low speed or is stopped is significantly more difficult, however. The difference in loads on the steering system when an aircraft is traveling at taxi speed and when an aircraft is moving slowly or not at all is substantial and can have a major effect on steering system performance and, ultimately, the useful life of the steering system.

The present invention is designed to control steering in an aircraft equipped with an engines-off wheel drive system controllable to move the aircraft autonomously during ground travel and to enable effective steering system operation when the aircraft is traveling very slowly or is stopped. Operation of the aircraft's hydraulic steering system is augmented or replaced by the operation of the wheel drive system to turn the aircraft's nose wheels and change the aircraft's ground travel direction. As a result, the forces that would otherwise be exerted on the aircraft's hydraulic steering system components when the steering system turns the nose wheels under these conditions are substantially reduced or eliminated.

In accordance with the present invention, an aircraft is equipped with a nose wheel steering system and, additionally, one or more engines-off wheel drive means operable and controllable to drive one or more aircraft landing gear wheels and move the aircraft autonomously during taxi without reliance on an aircraft's main engines or external tow vehicles. One or more nose landing gear wheels or main landing gear wheels can be equipped with such wheel drive means, which are preferably mounted in or adjacent to a selected wheel or wheels to be driven, but may be mounted in any location where they are drivingly connected with the selected wheel or wheels and capable of driving them to move an aircraft. Steering control is most effective in accordance with the present invention when each one of a pair of nose landing gear wheels is equipped with wheel drive means as described below.

One, and preferably both, of an aircraft's nose wheels may be equipped with a wheel drive system such as that shown and described in co-pending International Patent Application No. PCT/US/13/51407, filed Jul. 19, 2013 and entitled Aircraft Drive Wheel System with Roller Traction Drive System, the disclosure of which is fully incorporated herein by reference. This wheel drive system, which includes a non-engine drive means actuated by a clutch-activated roller traction drive system, drives an aircraft wheel on which it is drivingly mounted without reliance on power from the aircraft's main engines to move the aircraft autonomously during ground travel. It is preferred that both wheels in an aircraft's nose landing gear be equipped with such wheel drive systems to provide optimum steering control during ground movement.

An aircraft's nose wheels may also be equipped with other kinds of wheel drive systems, such as, for example, that disclosed in commonly owned U.S. patent application Ser. No. 13/082,932, filed Apr. 8, 2011, and entitled Integrated Electric Motor and Gear in an Aircraft Wheel, the disclosure of which is fully incorporated herein by reference. The wheel drive system selected to power the aircraft's nose wheels and control steering as described herein should be controllable to drive an aircraft's wheels to move the aircraft independently of the operation of the aircraft's main engines or tow vehicles.

Referring to the drawings, FIG. 1 shows an aircraft 10 taxiing along a runway 12 at an airport or airfield. Runway 12 intersects with another runway or taxiway 14 at an intersection 16. When the aircraft 10 arrives at intersection 16, it will be required to turn either left or right, depending on its ground travel route. If the aircraft 10 is able to maintain taxi speed during the turn, the aircraft's steering system should be able to turn the aircraft's nose wheels in the required direction and maneuver the aircraft through the turn. However, if a second aircraft (not shown) is traveling along runway 14 so that the aircraft 10 must stop at the intersection 16 before turning, once the intersection is clear, aircraft 10 will be required to turn from an essentially stopped position. In this situation, the aircraft's steering system is subjected to significantly greater forces as the aircraft is turned than when the aircraft is moving at taxi speed. If the aircraft 10 is equipped with a wheel drive system, for example, without limitation, one of the wheel drive systems referred to above, the aircraft's travel along the runway 12 is powered and controlled by the wheel drive system. The aircraft may be turned from a stopped position by augmenting or replacing operation of the aircraft's steering system with operation of the wheel drive system.

When each of the aircraft nose wheels is powered by a wheel drive system, each wheel drive system may be activated separately to drive the nose wheel it is designed to power. The differential speeds of rotation possible when each nose wheel is powered separately may produce a steering action that moves the aircraft toward the more slowly rotating nose wheel. If the nose wheel toward the left side of the aircraft's cockpit is rotating more slowly than the nose wheel on the right, the aircraft will turn toward the left. Conversely, if the nose wheel toward the right side of the aircraft's cockpit is rotating more slowly than the nose wheel on the left, the aircraft will turn toward the right. As a result, the direction of travel of the aircraft can be changed by operating the wheel drive system to produce a speed differential between the nose wheels without operation of the aircraft steering system, thus eliminating loads on the steering system at low speeds or when the aircraft is stopped.

It is additionally contemplated that both the steering system and the wheel drive system could be operational simultaneously, most likely at very low aircraft speeds. In this case, the differential speeds of the nose wheels produced by operation of a respective wheel drive system powering a nose wheel may enhance the turning action of the steering system. Reducing and/or eliminating forces on an aircraft's steering system will prolong the effective life of the steering system.

The steering system controls and the wheel drive system controls are preferably integrated so that at a predetermined nose wheel or aircraft speed or other suitable predetermined parameter, the steering system may be either inactivated or activated to operate at only a low level. The wheel drive system may be activated as required to differentially rotate each nose wheel at a speed that will turn the aircraft in a desired direction of ground travel. Ideally, these control systems are designed so that the steering system controls are neutralized or overridden only at low ground travel speeds or when the aircraft is stopped on the ground and must turn. Such systems would not be operational when the aircraft is in flight.

Figure 2:
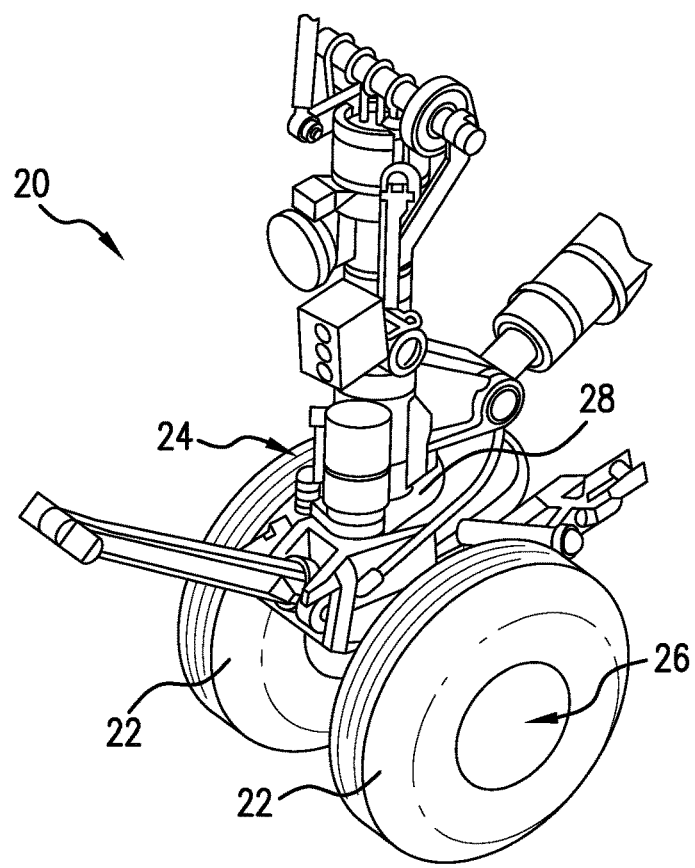
FIG. 2 is a perspective view of an aircraft nose landing gear wheel assembly equipped with an engines-off wheel drive system for autonomous aircraft ground movement and a nose wheel steering system.

FIG. 2 illustrates a perspective view of an aircraft nose landing gear assembly 20 with two nose wheels 22 rotatably mounted on an axle (not shown) attached to a strut 24. Each nose wheel is equipped with a wheel drive system indicated at 26. The wheel drive system 26 is optimally mounted within the volume provided within a nose wheel 22, but may be mounted in another suitable location to power and drive the nose wheel. A swivel structure 28 may include gearing (not shown) and/or other structures connected to steering system hydraulic components that are activated to cause the swivel structure 28 to move in a desired direction to swivel the nose wheels toward the right or the left relative to an aircraft pilot's location in the cockpit.

Figure 3:
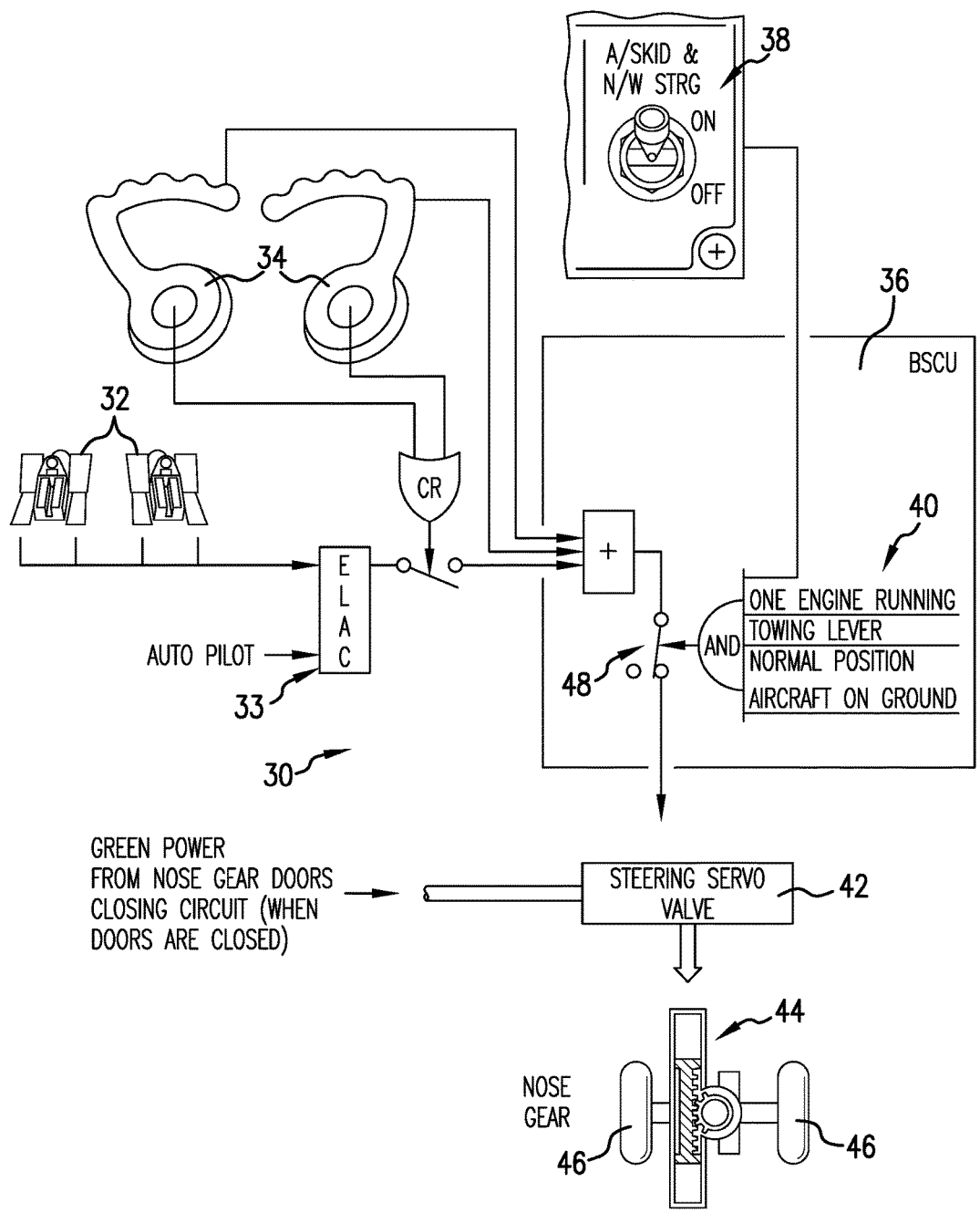
FIG. 3 is a schematic representation of one type of aircraft steering system and steering control system useful with the present invention.

FIG. 3 illustrates a schematic diagram of a steering system 30 that is used in an Airbus A320 aircraft. This aircraft relies on operation of at least one of the aircraft's main engines and a tow vehicle to move the aircraft on the ground. The aircraft pilot and cockpit crew control the system through rudder pedals, indicated at 32, and tiller wheels, indicated at 34. The autopilot component 33 is not used when the aircraft is traveling on the ground. Signals from the rudder pedals 32 and the tiller wheels 34 are directed to a brake and steering control unit 36. A switch 38 can be activated to turn on both nose wheel steering and an antiskid function when the aircraft is on the ground. When the conditions indicated at 40 are satisfied, a steering servo valve 42 activates the nose wheel steering system 44 to turn the nose wheels 46 in a desired direction. The conditions indicated at 40 that must be met before the nose wheel steering system 44 can be activated are: one engine is running, the towing lever is in a normal position, and the aircraft is on the ground, indicating that this system relies on operation of at least one aircraft main engine and/or a tow vehicle to power ground movement. If the foregoing conditions are not met, the switch 48 is not closed, and the nose wheel steering system cannot be activated.

In the aircraft steering control system of the present invention, each nose wheel may be equipped with an engines-off wheel drive system controllable to move the aircraft on the ground. Therefore, since the aircraft engines are not running and a tow vehicle is not required, other than the aircraft being on the ground, the conditions indicated at 40 in the FIG. 3 steering control system do not need to be satisfied to operate the present nose wheel steering system.

The steering control system of the present invention may operate with a range of controls and switches that enable cooperative functioning of an engines-off wheel drive system with an aircraft's existing ground steering system. Appropriate controls and switches may be designed to integrate operation of a wheel drive system with an aircraft steering system. These controls may inactivate or reduce activation of the nose wheel steering system under selected conditions, such as a predetermined aircraft low speed, and may activate the wheel drive system to steer the aircraft through differential rotation of the nose wheels as described above. The system shown in FIG. 3 is illustrative of only one possible type of steering system or steering control system. Other kinds of steering systems and steering system controls in addition to that shown in FIG. 3 are also contemplated for use with the present invention. A preferred aircraft steering system or steering control system is a system that may be integrated with an engines-off wheel drive system to effectively control nose wheel steering over the wide range of speeds and turning conditions likely to be encountered while an aircraft is autonomously driven on the ground between landing and takeoff by the wheel drive system.

While the present invention has been described with respect to preferred embodiments, this is not intended to be limiting, and other arrangements and structures that perform the required functions are contemplated to be within the scope of the present invention.

INDUSTRIAL APPLICABILITY

The control of steering possible in an aircraft equipped with an engines-off wheel drive system for autonomous ground travel provided by the present invention will find its primary applicability when it is desired to enhance the control of aircraft steering to change ground travel direction at a range of aircraft ground speeds.

The invention claimed is:

1. A method for controlling steering in aircraft equipped with nose landing gear wheel drive systems for autonomous ground travel that reduces or eliminates forces on the aircraft's nose landing gear hydraulic steering system when the aircraft is turned to change direction of ground travel, comprising:
   a. providing an aircraft with a nose landing gear supporting a pair of nose wheels and a hydraulic nose wheel steering system controllable to swivel the nose wheels and turn the aircraft in a desired direction during ground travel;
   b. mounting a wheel drive system comprising an electric drive motor controllably powered to drive and steer the aircraft during ground travel without reliance on operation of aircraft engines within each one of the pair of nose wheels;
   c. providing controls for the hydraulic nose wheel steering system operable to control swiveling of the nose wheels and turning of the aircraft and controls for the wheel drive system operable to control actuation of the electric drive motor mounted within each nose wheel, speed of the aircraft during ground travel, and direction of ground travel operationally integrated with the hydraulic nose wheel steering system controls;
   d. operating the wheel drive system controls to actuate the electric drive motors and move the aircraft during ground travel and operating the hydraulic nose wheel steering system controls to swivel the nose wheels and turn the aircraft when the aircraft is moved above a predetermined speed by the electric drive motors; and
   e. when the aircraft is stopped or the aircraft is moving at the predetermined speed or at a speed lower than the predetermined speed during ground travel, operating only the wheel drive system controls and controlling actuation of the electric drive motors to turn and move the aircraft.

2. The method of claim 1, further comprising providing a hydraulic nose wheel steering system controls override and overriding the hydraulic nose wheel steering system controls when the aircraft is traveling at the speed lower than the predetermined speed or the aircraft is stopped and the wheel drive systems controls are operated to change direction of ground travel of the aircraft.

3. The method of claim 1, further comprising when said aircraft is stopped or moving at the speed lower than the predetermined speed and is required to change ground travel direction, operating the wheel drive systems controls and controlling actuation of each electric drive motor to drive one nose wheel at a slower speed than the other nose wheel, and turning the aircraft toward the nose wheel driving at the slower speed.

4. The method of claim 1, further comprising when the aircraft is stopped, inactivating the hydraulic nose wheel steering system controls and activating the wheel drive systems controls to differentially actuate each electric drive motor to turn the aircraft in a desired direction and move the aircraft in the desired direction.

5. The method of claim 1, further comprising selectively actuating each electric drive motor in each one of the nose landing gear wheel drive systems and driving each nose landing gear wheel independently and at a different speed when ground travel speed of the aircraft is at or lower than the predetermined speed or when the aircraft is stopped.

6. The method of claim 1, further comprising augmenting operation of the hydraulic nose wheel steering system with operation of the nose landing gear wheel drive systems and simultaneously controlling operation of the nose landing gear wheel drive systems and the hydraulic nose wheel steering system to move the aircraft and change the aircraft direction of ground travel.

* * * * *